United States Patent
Patel et al.

(10) Patent No.: US 12,113,393 B2
(45) Date of Patent: Oct. 8, 2024

(54) SELF-POWERED IED FOR A POLE-MOUNTED AUTO-RECLOSER

(71) Applicant: ABB Schweiz AG, Baden (CH)

(72) Inventors: Nishith Patel, Bengaluru (IN); Pravin Vadhiyar, Navsari (IN); Lohith V, Bengaluru (IN)

(73) Assignee: ABB Schweiz AG, Baden (CH)

( * ) Notice: Subject to any disclaimer, the term of this patent is extended or adjusted under 35 U.S.C. 154(b) by 203 days.

(21) Appl. No.: 17/946,869

(22) Filed: Sep. 16, 2022

(65) Prior Publication Data
US 2023/0011609 A1    Jan. 12, 2023

Related U.S. Application Data

(63) Continuation of application No. PCT/IB2021/051927, filed on Mar. 9, 2021.

(30) Foreign Application Priority Data

Mar. 31, 2020   (IN) .............................. 202041014222

(51) Int. Cl.
  *H02J 7/34*   (2006.01)
  *H02J 9/06*   (2006.01)

(52) U.S. Cl.
  CPC .............. *H02J 7/345* (2013.01); *H02J 9/065* (2013.01); *H02J 9/068* (2020.01)

(58) Field of Classification Search
  CPC ............ H02J 7/345; H02J 9/065; H02J 9/068; H02H 1/06; H02H 3/04; H02H 3/07
(Continued)

(56) References Cited

U.S. PATENT DOCUMENTS

| 4,115,832 A | * | 9/1978 | Nakamura | ................ H03K 3/57 361/256 |
| 4,344,100 A | * | 8/1982 | Davidson | ................ H01H 73/14 361/45 |

(Continued)

FOREIGN PATENT DOCUMENTS

| CN | 201078829 Y |   | 6/2008 |   |
| CN | 104731084 A | * | 6/2015 | ......... G05B 23/0213 |

(Continued)

OTHER PUBLICATIONS

European Patent Office, International Search Report in International Patent Application No. PCT/IB2021/051927, 4 pp. (Jun. 18, 2021).

(Continued)

*Primary Examiner* — Dharti H Patel

(74) *Attorney, Agent, or Firm* — Leydig, Voit & Mayer, Ltd.

(57) ABSTRACT

A self-powered IED for a pole-mounted auto-recloser connected to an electric line includes a main control module and a lockout indication module. The main control module determines a fault in the electric line and trips the auto-recloser. During a permanent fault in the electric line, the auto-recloser is remained open, and the main control module activates a lockout state by generating a lockout set signal. The lockout indication module comprises a light source and super-capacitors. The super-capacitors provide stored charges to the light source when the lockout state is activated to provide notification throughout the lockout state.

10 Claims, 2 Drawing Sheets

(58) Field of Classification Search
USPC .......................................................... 361/59
See application file for complete search history.

(56) References Cited

U.S. PATENT DOCUMENTS

| | | | |
|---|---|---|---|
| 7,315,169 B1 | 1/2008 | Fenske et al. | |
| 2008/0089012 A1* | 4/2008 | Kon ..................... | H01G 11/28 |
| | | | 361/502 |
| 2010/0253245 A1* | 10/2010 | Du ........................ | H05B 45/50 |
| | | | 315/310 |
| 2014/0091714 A1* | 4/2014 | Sutardja .................. | H02H 9/02 |
| | | | 361/57 |
| 2014/0265884 A1* | 9/2014 | Chung .................. | H05B 45/35 |
| | | | 307/17 |
| 2017/0276464 A1* | 9/2017 | Cayer ..................... | F42B 27/00 |
| 2018/0106851 A1 | 4/2018 | Schweitzer, III et al. | |
| 2020/0099218 A1* | 3/2020 | Adams ..................... | H02H 7/26 |
| 2022/0029407 A1* | 1/2022 | Patel ................... | H02H 1/0007 |

FOREIGN PATENT DOCUMENTS

| | | | | |
|---|---|---|---|---|
| GB | 2462001 A | | 1/2010 | |
| WO | WO-2021249937 A1 * | | 12/2021 | .............. H04W 4/80 |

OTHER PUBLICATIONS

European Patent Office, Written Opinion in International Patent Application No. PCT/IB2021/051927, 6 pp. (Jun. 18, 2021).

* cited by examiner

SELF-POWERED IED FOR A POLE-MOUNTED AUTO-RECLOSER

CROSS-REFERENCE TO RELATED APPLICATIONS

This patent application claims priority to International Patent Application No. PCT/IB2021/051927, filed on Mar. 9, 2021, which claims priority to Indian Patent Application No. 202041014222, filed on Mar. 31, 2020, both of which are incorporated herein in their entirety by reference.

FIELD OF THE DISCLOSURE

The present disclosure relates to auto-reclosers and, more particularly, to an Intelligent Electronic Device (IED) for a pole-mounted auto-recloser having supercapacitors.

BACKGROUND OF THE INVENTION

Auto-reclosers are protective devices used to isolate circuits and electrical devices from faulty line. Auto-reclosers comprise actuators configured to be opened when there is a fault in an electrical line and to be closed when the fault is rectified. When the fault in the line is temporary (e.g., fault due to lightning), the actuator is reclosed successfully. When the fault in the line is permanent (e.g., short circuit), the actuator is reclosed and opened several times as the fault persists in the line. When a permanent fault occurs, the actuator remains open after reclosing for predefined iterations, and a lockout state is activated where a notification is provided to indicate an operator about the permanent fault.

Generally, when a lockout state is activated, a visible notification is provided. Traditional solutions included displaying a mechanical flag during lockout indication since the flag does not consume power. However, the mechanical flag is not visible in poor light conditions. Existing solutions use light indications which are powered by batteries. Typically, the light indications must last for several hours and batteries do not provide back-up for several hours. Further, batteries have additional disadvantages including limitation of working in different temperature and expensive replacement of batteries.

BRIEF SUMMARY OF THE INVENTION

There is a need to provide a solution, which provides back-up for several hours to provide visible light indications. In an embodiment, the present disclosure describes a self-powered Intelligent Electronic Device (IED) for a pole-mounted auto-recloser. The auto-recloser is connected to an electric line. The IED comprises a main control module and a lockout indication module. The main control module is configured to detect a fault in the electric line and operate the auto-recloser. The main control module is configured to one of, reclose the auto-reclosure when a temporary fault occurs in the electric line or activate a lockout state by tripping the auto-reclosure permanently when a permanent fault occurs in the electric line. The lockout state is activated by generating a lockout set signal. The lockout indication module comprises a light source for providing an indication. The lockout indication module further comprises one or more super-capacitors configured to store electric charges. The one or more super-capacitors provide the stored electric charges to the light source when the lockout set signal is generated.

In an embodiment the IED comprises a power control module comprising a storage unit configured to power the main control module and to operate a vacuum interrupter of the auto-reclosure to trip the auto-reclosure.

In an embodiment the lockout indication module further comprises a first converter configured to convert a high voltage to a low voltage to charge the one or more super-capacitors, a second converter configured to convert a low voltage from the one or more super-capacitors to an intermediate voltage to power at least the light source, a light source driver configured to drive the LED according to a predefined pattern and a control and conditioning module to receive the lockout set signal from the main control module and enable the one or more super-capacitors to provide the electric charges to the light source; and provide the predefined pattern to the light source driver. In an embodiment, the control and conditioning module generates the predefined pattern to toggle the light source for predefined time period. In an embodiment, the control and conditioning module is configured to generate one or more pulses having predefined duty cycles, indicative of the predefined pattern.

In an embodiment, the one or more super-capacitors are charged when the electric line is operational and discharged during the lockout state.

In an embodiment, the main control module is configured to activate the lockout state when fault occurs in the electric line after the vacuum interrupter is operated to reclose the auto-recloser for a predefined iterations. In an embodiment, the main control module is configured to detect the fault in the electric line using inputs from one or more current sensors connected to the electric line.

In an embodiment, the main control module is configured to charge the one or more super-capacitors. In an embodiment, the main control module is configured to provide the lockout set signal in a single pulse.

BRIEF DESCRIPTION OF THE SEVERAL VIEWS OF THE DRAWING(S)

DETAILED DESCRIPTION OF THE INVENTION

Embodiments of the present disclosure relate to a self-powered Intelligent Electronic Device (IED) for a pole-mounted auto-recloser. The auto-recloser is connected to an electric line for protecting circuits and electronic devices connected to the electric line. The IED comprises a main control module and a lockout indication module. The main control module determines a fault in the electric line and trips the auto-recloser. Based on the type of fault (temporary or permanent) the auto-recloser is either closed or remains open. When the auto-recloser remains open, the main control module activates a lockout state by generating a lockout set signal. The lockout set signal is provided to the lockout indication module. The lockout indication module comprises a light source and a super-capacitor. The super-capacitor provides stored charges to the light source when the lockout state is activated to provide notification throughout the lockout state. Hence, the present invention provides a solution to power the light source for longer hours compared to existing solutions.

Figure 1:
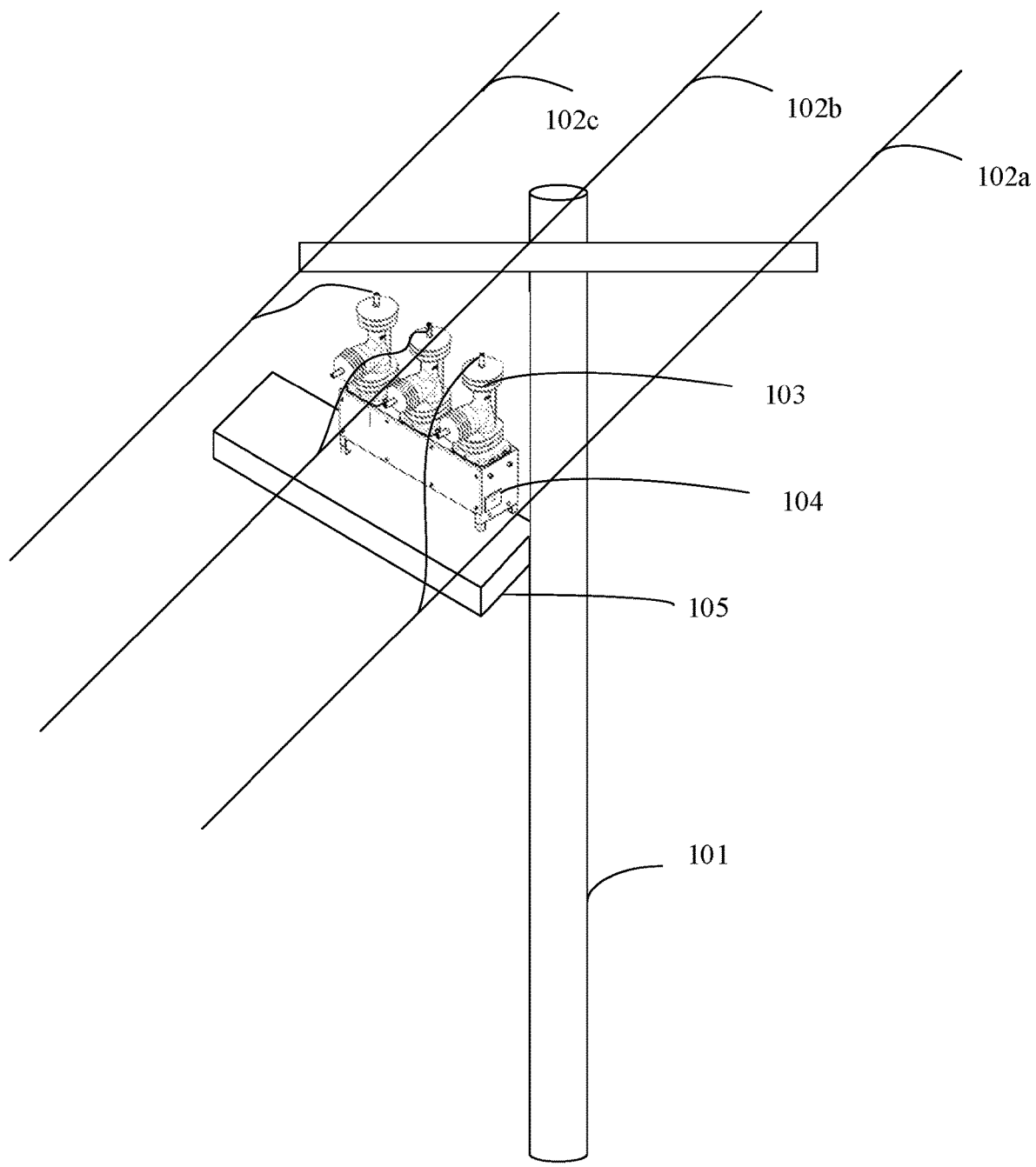
FIG. 1 illustrates a pole-mounted auto-reclosure and an Intelligent Electronic Device (IED) associated with the auto-recloser, in accordance with an embodiment of the present disclosure.

FIG. 1 illustrates a pole-mounted auto-reclosure and an Intelligent Electronic Device (IED) associated with the auto-recloser. FIG. 1 discloses a pole (101), one or more electric lines (102a, 102b, 102c), an auto-recloser (103), an Intelligent Electronic Device (IED) (104) and a support member (105). The one or more electric lines (102a, 102b, 102c) may be high voltage lines or medium voltage lines or low voltage lines. In an embodiment, the one or more electric lines (102a, 102b, 102c) may be connecting between two substations (not shown in FIG. 1) or between a substation and a utility (not shown in FIG. 1). In an embodiment, the one or more lines (102a, 102b, 102c) may be a three-phase line. Each line may carry single-phase current. The auto-recloser (103) and the IED (104) (also commonly known as control cabinet) are mounted on the pole (101) using the support member (105). In an embodiment, the auto-recloser (103) disclosed in FIG. 1 may be a three-phase auto-recloser (3 single-phase auto-reclosers). Although, the FIG. 1 discloses a three-phase auto-recloser, a person of ordinary skills should appreciate that the working of the present invention is applicable to single-phase auto-recloser as well, and the aspects of the present invention should not be considered as a limitation. In an embodiment, the auto-recloser (103) is configured to trip and isolate one or more circuits or electric devices connected to the one or more electric lines (102a, 102b, 102c). The auto-recloser (103) is further configured to be reset and reconnect the circuits and the electric devices with the one or more electric lines (102a, 102b, 102c) when is fault is rectified. The auto-recloser (103) may be a circuit breaker having a reclosing mechanism.

In an embodiment, the IED (104) may support low voltages and another IED (not shown in FIG. 1) may be mounted on the pole to support medium voltages and high voltages. In an embodiment, the IED (104) may support low voltages, medium voltages and high voltages. The IED (104) may be configured to operate the auto-recloser (103) to auto-reclose after tripping, when a temporary fault occurs and operate the auto-recloser (103) to remain open (tripped) when a permanent fault occurs. The IED (104) determines the temporary and main faults based on a current flowing through the one or more electric lines (102a, 102b, 102c). An example of cause for temporary fault may include, but is not limited to, a lightening. An example of cause for permanent fault may include, but is not limited to, short circuit.

Figure 2:
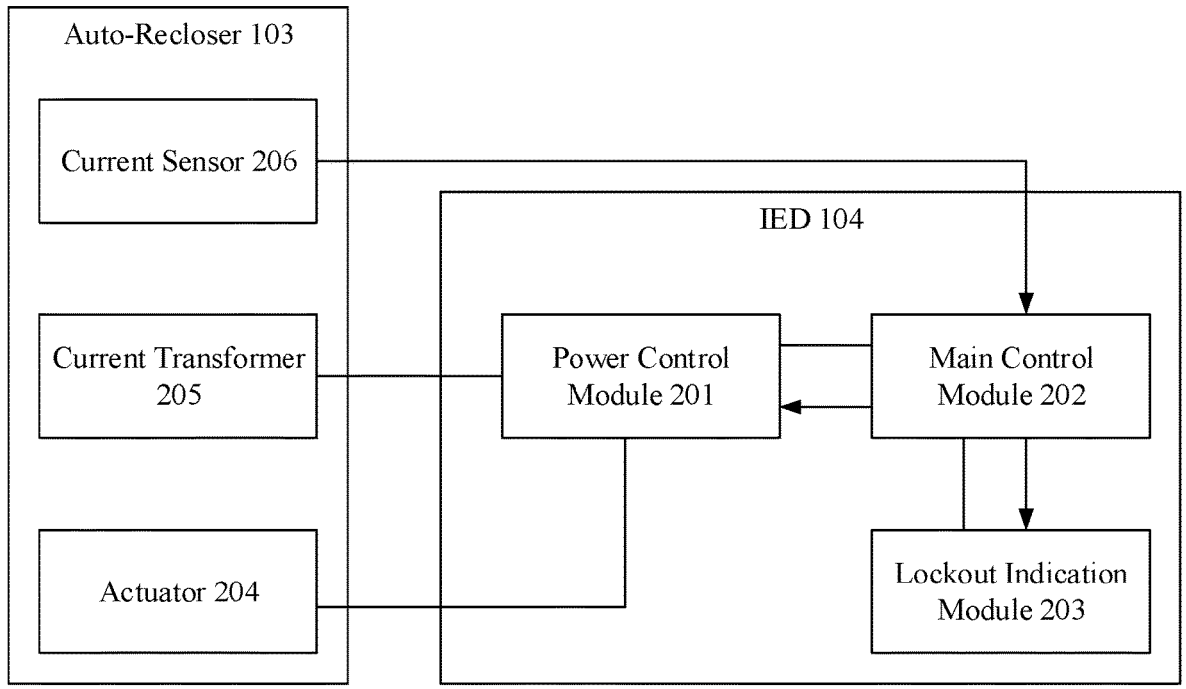
FIG. 2 illustrates a simplified block diagram of an Intelligent Electronic Device (IED) for operating an auto-recloser, in accordance with an embodiment of the present disclosure.

FIG. 2 illustrates a simplified block diagram of the IED (104) and the auto-recloser (104). As shown, the IED (104) comprises a power control module (201), a main control module (202) and a lockout indication module (203). The auto-recloser (103) comprises an actuator (204) which operates a vacuum interrupter (not shown) of the auto-recloser (103), a current transformer (205) and a current sensor (206).

The power control module (201) is configured to manage power in the IED (104). In an embodiment, the power control module (201) comprises a storage unit (not shown in FIG. 2). The storage unit may comprise one or more storage capacitors or chemical cells. Preferably capacitors are used as they can be charged efficiently. When the one or more electric lines (102a, 102b, 103c) carry current without fault, the storage unit of the power control module is charged. In an embodiment, the power control module (201) draws current from the current transformer (205) connected to the one or more electric lines (102a, 102b, 102c), to charge the storage unit. Further, the power control module (201) provides power to the main control module (202) from the drawn current from the one or more electric lines (102a, 102b, 102c). Also, the power control module (201) may provide additional power to the main control module (202) for the main control module (202) to operate the lockout indication module (203). When a fault in the one or more electric lines (102a, 102b, 102c) is detected, the power control module (201) is configured to provide power to the actuator (204) is configured to trip the vacuum interrupter, and reclose the vacuum interrupter after a predetermined time period. Further, the power control module (201) and the main control module (202) are powered by the storage unit in the power control module (201) when the auto-recloser (103) is tripped. In an embodiment, the storage unit may provide power to the power control module (201) and the main control module (202) for a predetermined time period (e.g., 40 s-60 s). Further, the storage unit may provide power to the actuator (204) until the fault is rectified or a lockout state is activated.

In an embodiment, the main control module (202) is configured to detect faults in the one or more electric lines (102a, 102b, 102c). The main control module (202) receives current values from the current sensor (206). Using the current values, the main control module (203) determines fault in the one or more electric lines (102a, 102b, 102c). When a fault is detected in the one or more electric lines (102a, 102b, 102c), the main control module (202) provides a trip signal to the power control module (201) and the power control module (201) provides power to the actuator (204) which trips the vacuum interrupter. In an embodiment, the vacuum interrupter may be configured to reclose after the predetermined time period (e.g., 1 s, or 2 s). The main control module (202) receives the current value from the current sensor (206) at regular intervals (e.g., every 5 ms) and determines if the fault persists in the one or more electric lines (102a, 102b, 102c). If the fault persists, the main control module (202) provides another trip command to the power control module (201) and the power control module (201) provides power to the actuator (204) for tripping the vacuum interrupter again. The vacuum interrupter may be operated for predefined iterations until the main control module (202) determines that the fault is permanent and activates a lockout state. When the main control module (202) determines that the fault in the one or more electric lines (102a, 102b, 102c) is permanent, the main control module (202) activates the lockout state by generating a lockout set signal. In an embodiment, the lockout set signal is provided to the lockout indication module (203). In an embodiment, the lockout set signal may be a single pulse to consume less power. The power control module (201) may not provide the power to the actuator (204), thus not reclosing the vacuum interrupter, and hence the vacuum interrupter remains in the tripped position or open position throughout the lockout state.

In an embodiment, the lockout indication module (203) is activated when the lockout state is activated by the main control module (202). The lockout indication module (203) is configured to provide notifications regarding the lockout state.

Figure 3:
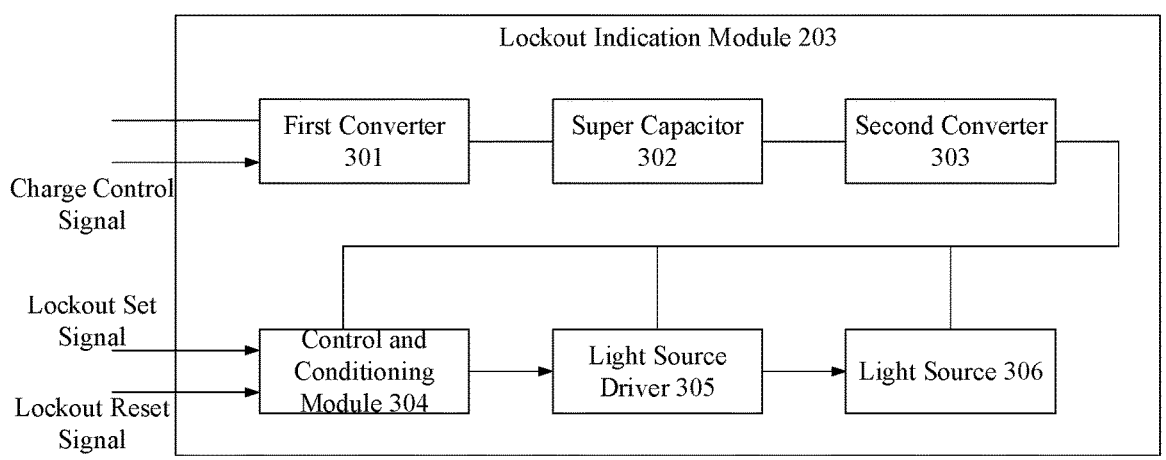
FIG. 3 illustrates a simplified block diagram of a lockout indication module of an Intelligent Electronic Device (IED) for powering a light source, in accordance with an embodiment of the present disclosure.

FIG. 3 illustrates a simplified block diagram of a lockout indication module (203) of IED (104) for powering a light source. The lockout indication module (203) comprises a first converter (301), a super-capacitors (302), a second converter (303), a control and conditioning module (304), a light source driver (305) and a light source (306). Although, FIG. 3 shows one super-capacitor (302), it should be obvious to a person skilled in the art that more of such super-capacitors can be provided in the lockout indication module (203).

The first converter (301) is configured to convert a high voltage signal to a low voltage signal to charge the super capacitor (302). For example, the high voltage signal may be 24 v from the main control module (202). The first converter (301) may convert the 24 v signal to 2.4 v signal. In an embodiment, the first converter (301) may be a Buck converter. The first converter (301) provides the low voltage signal to the super-capacitor (302) for charging the super-capacitor (302). In an embodiment, the first converter (301) also receives a charge control signal from the main control module (203). The charge control signal may indicate when to provide the low voltage signal for charging the super-capacitor (302).

In an embodiment, the super-capacitor (302) is configured to be charged when a low voltage signal is received from the first converter (301). The super-capacitor (302) comprises large dielectric plates, enabling more charges to be stored compared to a regular capacitor. The super-capacitors (302) are discharged when the light source (306) is operated. In an embodiment, the super-capacitor (302) is also discharged when the control and conditioning module (304) and the light source driver (305) are operated. However, the power consumed by the control and conditioning module (304) and the light source driver (305) may be substantially less.

In an embodiment, the second converter (303) is configured to convert the low voltage signal from the super-capacitor (302) to an intermediate voltage signal. For example, the intermediate voltage signal may be 3.6 v. In an embodiment, the second converter (303) may be a Boost converter. The second converter (303) is further connected to the control and conditioning module (304), the light source driver (305) and the light source (306) for providing power from the super-capacitor (303).

In an embodiment, the control and conditioning module (304) is configured to enable the super-capacitor (302) to provide the electric charges to the light source (306) upon receiving the lockout set signal from the main control module (203). When the control and conditioning module (304) receives the lockout set signal, a predefined pattern is provided to the light source driver (305). The predefined pattern may be generated to toggle the light source (306) for a predefined time period. For example, the light source (306) may be operated to provide light notifications every 4 s. Further, the light source (306) may be operated such that the light notification lasts for 25 ms. The predefined pattern may be determined to save power while providing notification about the permanent fault in the one or more electric lines (102a, 102b, 102c). In an embodiment, the control and conditioning module (304) generates pulses with appropriate duty cycle according to the predefined pattern, and provides the pulses to the light source driver (305). In an embodiment, the control and conditioning module (304) may also receive a lockout reset signal from the main control module (202) when the fault is rectified. In an embodiment, the control and conditioning module (304) may comprise a manual switch to reset the indication. For example, an operator may reset the indication after rectifying the fault in the one or more electric lines (102a, 102b, 102c).

In an embodiment, the light source driver (305) is configured to provide pulses suitable to the light source (306) to provide the light notifications. In an embodiment, the light source driver (305) generates the pulses according to the duty cycle provided by the control and conditioning module (304) to operate the light source according to the predefined pattern. In an embodiment, the light source (306) is operated only when the light source driver (305) provides the suitable pulses. Hence, the super-capacitor (302) does not discharge although the super-capacitor (302) is always connected to the light source (306).

In an embodiment, the light source (306) is configured to provide light notifications according to the predefined pattern. In an embodiment, the light source is a Light Emitting Diode (LED). In an embodiment, the light source (306) may be coloured (preferably red or yellow or green) to provide indication, which is visible even from a long distance.

In an embodiment, the present invention overcomes the limitation of reduced power back-up during lockout state. The present invention uses the super-capacitor (302) to provide back-up to provide notifications during the lockout state. Hence, the notification about the fault in the one or more electric line (102a, 102b, 102c) is provided. Thus, timely maintenance can be scheduled and faults can be rectified immediately.

REFERENCE NUMERALS

101—Pole
102a, 102b, 102c—Electric lines
103—Auto-recloser
104—IED
201—Power control module
202—Main control module
203—Lockout indication module
204—Actuator
205—Current transformer
206—Current sensor
301—First converter
302—Super-capacitor
303—Second capacitor
304—Control and conditioning module
305—Light source driver
306—Light source All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An Intelligent Electronic Circuit (IED) configured to control a pole-mounted auto-reclosure connected to an electric line, the IED comprising:
    a main control module configured to:
        detect a fault in the electric line and operate the auto-recloser, wherein the main control module is configured to one of: reclose the auto-reclosure when a temporary fault occurs in the electric line, and activate a lockout state by tripping the auto-reclosure permanently when a permanent fault occurs in the electric line;
        wherein the main control module generates a lockout set signal to activate the lockout state; and
    a lockout indication module comprising:
    a light source for providing an indication; and
    one or more super-capacitors configured to store electric charges, wherein the one or more super-capacitors provide stored electric charges to operate the light source when the lockout set signal is generated.

2. The IED as claimed in claim 1, further comprising a power control module, the power control module comprising a storage unit configured to power the main control module and to operate a vacuum interrupter of the auto-reclosure to trip the auto-reclosure.

3. The IED as claimed in claim 1, wherein the lockout indication module further comprises:
    a first converter configured to convert a high voltage signal from the electric line to a low voltage signal to charge the one or more super-capacitors;
    a second converter configured to convert the low voltage signal from the one or more super-capacitors to an intermediate voltage signal to power the light source;
    a light source driver configured to drive the light source according to a predefined pattern; and
    a control and conditioning module to receive the lockout set signal from the main control module and enable the one or more super-capacitors to provide the electric charges to the light source; and provide the predefined pattern to the light source driver.

4. The TED as claimed in claim 3, wherein the control and conditioning module generates the predefined pattern to toggle the light source for a predefined time period.

5. The TED as claimed in claim 3, wherein the control and conditioning module is configured to generate one or more pulses having predefined duty cycles, which are indicative of the predefined pattern.

6. The TED as claimed in claim 1, wherein the one or more super-capacitors are charged when the electric line is operational and discharged during the lockout state.

7. The TED as claimed in claim 1, wherein the main control module is configured to activate the lockout state when a fault occurs in the electric line after the vacuum interrupter is operated to reclose the auto-recloser for a predefined iterations.

8. The TED as claimed in claim 1, wherein the main control module is configured to detect the fault in the electric line using inputs from one or more current sensors connected to the electric line.

9. The TED as claimed in claim 1, wherein the main control module is configured to charge the one or more super-capacitors.

10. The TED as claimed in claim 1, wherein the main control module is configured to provide the lockout set signal in a single pulse.

* * * * *